United States Patent
Patel et al.

(10) Patent No.: US 7,801,295 B2
(45) Date of Patent: Sep. 21, 2010

(54) METHOD AND SYSTEM FOR PROVIDING AGENT TRAINING

(75) Inventors: Labhesh Patel, Mountain View, CA (US); Johnny H. Lee, Mountain View, CA (US); Fadi R. Jabbour, Sunnyvale, CA (US); David C. Lee, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 1350 days.

(21) Appl. No.: 11/125,632

(22) Filed: May 10, 2005

(65) Prior Publication Data

US 2006/0256954 A1    Nov. 16, 2006

(51) Int. Cl.
*H04M 3/00* (2006.01)
(52) U.S. Cl. .................. 379/265.12; 379/67.1; 379/68; 379/265.02; 379/266.04
(58) Field of Classification Search ................ 379/67.1, 379/68, 265.02, 266.04, 265.12
See application file for complete search history.

(56) References Cited

U.S. PATENT DOCUMENTS

| | | | |
|---|---|---|---|
| 5,757,644 A | 5/1998 | Jorgensen et al. ........... | 364/188 |
| 6,128,380 A * | 10/2000 | Shaffer et al. .......... | 379/265.01 |
| 6,324,282 B1 | 11/2001 | McIllwaine et al. .... | 379/265.06 |
| 6,459,787 B2 | 10/2002 | McIllwaine et al. .... | 379/265.06 |
| 6,628,777 B1 * | 9/2003 | McIllwaine et al. .... | 379/265.01 |
| 6,707,904 B1 | 3/2004 | Judkins et al. ......... | 379/265.06 |
| 6,775,377 B2 | 8/2004 | McIllwaine et al. .... | 379/265.06 |
| 7,174,010 B2 * | 2/2007 | McIlwaine et al. ..... | 379/265.01 |
| 2004/0165717 A1 * | 8/2004 | McIlwaine et al. ..... | 379/265.06 |

OTHER PUBLICATIONS

"Avaya Tenovis; Call Center; Features & Benefits," Avaya Menus, http://www.avaya.fr/Produits/Call_Center/feature%20benefits/features_benefits.asp?print=yes, 2 pages, 2003.

* cited by examiner

*Primary Examiner*—Melur Ramakrishnaiah
*Assistant Examiner*—Yosef K Laekemariam
(74) *Attorney, Agent, or Firm*—Baker Botts L.L.P.

(57) ABSTRACT

A method for providing training to agents of an automatic call distribution center includes determining whether an agent is idle and, in response to determining that the agent is idle, initiating playback of a recorded training call to the agent. Additionally, the method includes receiving an incoming call from a caller for connection with one of a plurality of agents. Also, the method includes terminating playback of the recorded training call and connecting the agent to the incoming call.

16 Claims, 3 Drawing Sheets

METHOD AND SYSTEM FOR PROVIDING AGENT TRAINING

TECHNICAL FIELD OF THE INVENTION

This invention relates in general to communication systems and, more particularly, to a method and system for providing training to agents answering calls in an automatic call distribution system.

BACKGROUND OF THE INVENTION

Automatic call distributors (ACDs) and other contact or call centers typically include specialized systems designed to match incoming requests for service, for example a telephone call or an e-mail, with a resource that is able to provide that service, for example a human call center agent. ACDs generally perform one or more of the following functions: (i) recognize and answer incoming calls; (ii) review database(s) for instructions on what to do with a particular call; (iii) using these instructions, identify an appropriate agent and queue the call, often times providing a prerecorded message; and (iv) connect the call to an agent as soon as the agent is available.

Some ACDs maintain queues that store calls while the calls are waiting to be connected with an agent. Furthermore, some systems dynamically move agents between queues, connecting these agents to calls in the queue. To achieve this functionality certain systems continuously calculate the service level (SL) for each queue. If they find that a certain queue is able to meet its target service level agreement (SLA) while another queue is falling behind, the system automatically moves agents from the queue that meets the SL to the queue that is falling behind.

In general, calls may be distributed among available agents in any appropriate manner to facilitate expedient handling of the calls. During busy times, calls may be stored in a queue until an agent becomes available to handle the call. During slow times, however, agents may wait idly until a caller calls into the ACD system. As a result, operation of the system may be inefficient, with agents wasting time when no callers are requesting service.

Additionally, in many types of ACDs, supervisors may monitor and/or record calls between callers and agents, either at the supervisor's discretion or at the request of the agent. Given enough storage, all calls can be recorded for post-call evaluation. Monitoring raises additional issues, however, particularly where the supervisor intends to monitor the call in real-time. Supervisors may be forced to monitor calls indiscriminately which may be unnecessarily time-consuming. Supervisors may also have access to call statistics to help them decide which calls to monitor and/or record, but using these statistics to determine when monitoring is appropriate may similarly require time expenditure that may prevent the supervisor from completing other tasks.

SUMMARY OF THE INVENTION

The present invention provides a method and system for transferring a call at an automatic call distribution system that substantially eliminates or reduces at least some of the disadvantages and problems associated with previous methods and systems.

In accordance with a particular embodiment of the present invention, a method for providing training to agents of an automatic call distribution center includes determining whether an agent is idle. The method also includes initiating playback of a recorded training call to the agent, in response to determining that the agent is idle. Additionally, the method includes receiving an incoming call from a caller for connection with one of a plurality of agents. The method further includes terminating playback of the recorded training call and connecting the agent to the incoming call.

In accordance with another embodiment, a method for providing training to agents of an automatic call distribution center includes determining whether any of a plurality of agents is idle and, in response to determining that one or more of the plurality of agents is idle, initiating playback of a recorded training call to one or more of the idle agents. Additionally, the method includes receiving an incoming call from a caller and, in response to receiving the incoming call, selecting an agent from the plurality of agents based on whether the selected agent is currently being played a recorded training call. The method also includes connecting the selected agent to the incoming call.

Technical advantages of particular embodiments of the present invention include methods and systems for processing a call at an automatic call distributor that reduces idle time for agents by providing agents training during idle times. Particular embodiments may also incorporate techniques for distributing calls in a manner that reduces interruptions to training and for logging training histories of agents. These techniques may result in more efficient use of time and resources.

Other technical advantages will be readily apparent to one skilled in the art from the following figures, descriptions and claims. Moreover, while specific advantages have been enumerated above, various embodiments may include all, some or none of the enumerated advantages.

BRIEF DESCRIPTION OF THE DRAWINGS

For a more complete understanding of the present invention and its advantages, reference is now made to the following description, taken in conjunction with the accompanying drawings, in which.

DETAILED DESCRIPTION OF THE INVENTION

Figure 1:
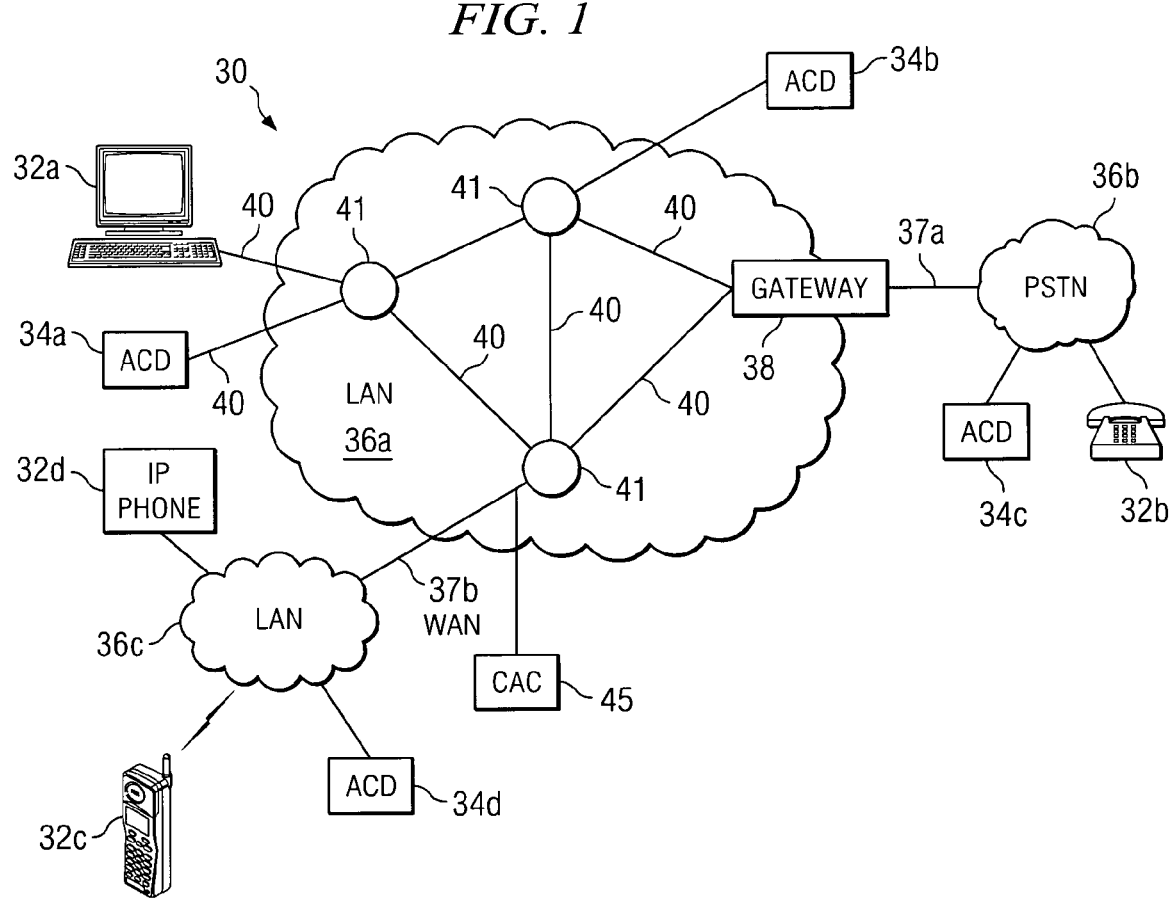
FIG. 1 illustrates a communication system including a plurality of endpoints operable to communicate among each other and a plurality of automatic call distributors, in accordance with a particular embodiment of the present invention.

FIG. 1 illustrates a communication system 30 that includes a plurality of endpoints 32*a*-32*d* having the ability to establish communication sessions between each other and/or automatic call distributors (ACDs) 34*a*-34*d*, using one or more of communication networks 36*a*-36*c*. ACDs 34*a*-34*d* are specialized communication systems designed to route incoming calls to available agents, so that calls are properly and/or evenly distributed. For the purposes of this specification, "automatic call distributor" or "ACD" shall refer to any combination of hardware, software and/or embedded logic which is operable to automatically distribute incoming calls. "Calls" shall include requests for service transmitted using any audio and/or video means, including signals, data or messages transmitted through voice devices, text chat, web sessions, facsimile, instant messaging and e-mail. ACDs may include outsourced call centers or other contact centers that receive incoming customer calls for distribution to agents and that place calls from agents to customers.

In particular embodiments, after connecting an incoming call to an agent, an ACD 34 may initiate a monitoring and/or recording session based on call metrics associated with the call. This may allow a supervisor to monitor or review the relevant agent's performance in handling the call. Additionally, in particular embodiments, ACD 34 may be able to connect idle agents to recordings of model calls to further the agent's training. This may allow the agent to make better use of free time between calls. As a result, ACDs 34 may provide features that facilitate improved agent performance. These features are described in greater detail below.

In the illustrated embodiment, communication network 36a is a local area network (LAN) that enables communication between a plurality of endpoints 32a-32d and ACDs 34a-34d distributed across multiple cities and geographic regions. In another embodiment, a single, central ACD may be used, which distributes incoming calls to agents distributed across multiple cities and geographic regions. Communication network 36b is a public switched telephone network (PSTN) and couples endpoint 32b and ACD 34c with communication network 36a through gateway 38. Communication network 36c is another LAN, which couples endpoints 32c and 32d and ACD 34d with communication network 36a. Accordingly, users of endpoints 32a-32d and automatic call distributors 34a-34d can establish communication sessions between and among each network component coupled for communication with one or more of networks 36a-36c. Communication links 37a and 37b couple communication networks 36a and 36b, and communication networks 36a and 36c, respectively. In the illustrated embodiment, communication link 37b is a wide area network (WAN), which couples LANs 36a and 36c. A call admission control (CAC) system 45 may be used to monitor and police the bandwidth available over WAN 37b.

Communication network 36a includes a plurality of segments 40 and nodes 41 that couple endpoint 32a with ACDs 34a and 34b, gateway 38, and communication networks 36b-36c. Therefore, a user of endpoint 32a is provided with access to endpoints 32b-32d and automatic call distributors 34a-34d. Nodes 41 may include any combination of network components, gatekeepers, call managers, conference bridges, routers, hubs, switches, gateways, endpoints, or other hardware, software, or embedded logic implementing any number of communication protocols that allow for the exchange of packets in communication system 30.

Although the illustrated embodiment includes three communication networks 36a-36c, the term "communication network" should be interpreted as generally defining any network capable of transmitting audio and/or video telecommunication signals, data, and/or messages, including signals, data or messages transmitted through text chat, instant messaging and e-mail. Any one of networks 36a-36c may be implemented as a local area network (LAN), wide area network (WAN), global distributed network such as the Internet, Intranet, Extranet, or any other form of wireless or wireline communication network. Generally, network 36a provides for the communication of packets, cells, frames, or other portions of information (generally referred to as packets herein) between endpoints 32a-32d. Communication network 36a may include any number and combination of segments 40, nodes 41, endpoints 32a-32d, and/or ACDs 34a-34d.

In a particular embodiment, communication network 36a employs voice communication protocols that allow for the addressing or identification of endpoints, nodes, and/or ACDs coupled to communication network 36a. For example, using Internet protocol (IP), each of the components coupled together by communication network 36a in communication system 30 may be identified in information directed using IP addresses. In this manner, network 36a may support any form and/or combination of point-to-point, multicast, unicast, or other techniques for exchanging media packets among components in communication system 30. Any network components capable of exchanging audio, video, or other data using frames or packet, are included within the scope of the present invention.

Network 36a may be directly coupled to other IP networks including, but not limited to, another LAN or the Internet. Since IP networks share a common method of transmitting data, telecommunication signals may be transmitted between telephony devices located on different, but interconnected, IP networks. In addition to being coupled to other IP networks, communication network 36a may also be coupled to non-IP telecommunication networks through the use of interfaces or components, for example gateway 38. In the illustrated embodiment, communication network 36a is coupled with PSTN 36b through gateway 38. PSTN 36b includes switching stations, central offices, mobile telephone switching offices, pager switching offices, remote terminals, and other related telecommunications equipment that are located throughout the world. IP networks transmit data (including voice and video data) by placing the data in packets and sending each packet individually to the selected destination, along one or more communication paths. Unlike a circuit-switched network (like PSTN 36b), a dedicated circuit is not required for the duration of a call or fax transmission over IP networks.

Technology that allows telecommunications to be transmitted over an IP network may comprise Voice over IP (VoIP), or simply Voice over Packet (VoP). In the illustrated embodiment, endpoint 32d, ACDs 34a-34b, and gateway 38 are IP telephony devices capable of participating in IM, video, and other multimedia communication sessions. IP telephony devices have the ability of encapsulating a user's voice (or other input) into IP packets so that the voice can be transmitted over network 36a. IP telephony devices may include telephones, fax machines, computers running telephony software, nodes, gateways, wired or wireless devices, hand held PDA, or any other device capable of performing telephony functions over an IP network.

In particular embodiments, communication system 30 may receive and transmit data in a session initiation protocol (SIP) environment. SIP is an application-layer control protocol that includes primitives for establishing, modifying and terminating communication sessions. SIP works independently of underlying transport protocols and without dependency on the type of session that is being established. SIP also transparently supports name mapping and redirection services, which support personal mobility.

It will be recognized by those of ordinary skill in the art that endpoints 32a-32d, ACDs 34a-34d and/or gateway 38 may be any combination of hardware, software, and/or encoded logic that provides communication services to a user. For example, endpoints 32a-32d may include a telephone, a computer running telephony software, a video monitor, a camera, an IP phone, a cell phone or any other communication hardware, software and/or encoded logic that supports the communication of packets of media (or frames) using communication network 36a. Endpoints 32a-32d may also include unattended or automated systems, gateways, other intermediate components or other devices that can establish media sessions. Although FIG. 1 illustrates a particular number and configuration of endpoints, ACDs, segments, nodes, and gateways, communication system 30 contemplates any number or arrangement of such components for communicating media.

Figure 2:
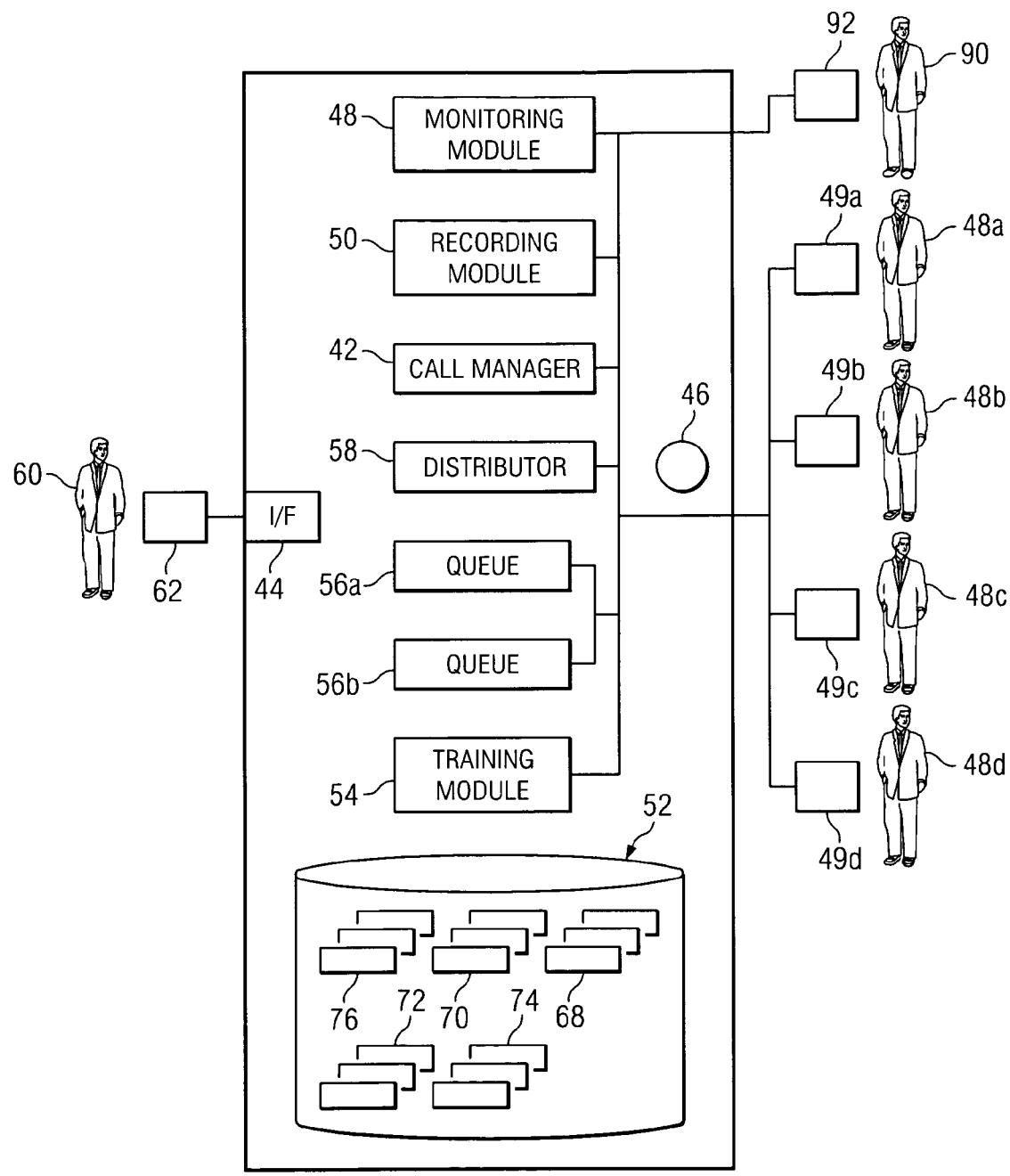
FIG. 2 illustrates an automatic call distributor of FIG. 1 in more detail, illustrating aspects of the present invention.

FIG. 2 illustrates ACD 34a in more detail, in accordance with a particular embodiment of the present invention. In the illustrated embodiment, ACD 34a includes a call manager 42, an interface or input ports 44, a processor 46, a monitoring module 48, a training module 54, a memory module 52, a recording module 50, queues 56 and a distributor 58. Interface or input ports 44 couple ACD 34a with communication network 36a.

Processor 46 may be a microprocessor, controller, or any other suitable computing device, resource, or combination of hardware, software and/or encoded logic. Memory module 52 may be any form of volatile or non-volatile memory including, without limitation, magnetic media, optical media, random access memory (RAM), read-only memory (ROM), removable media, or any other suitable local or remote memory component. In the illustrated embodiment, memory module 52 includes call metrics 68, call recordings 70, training profiles 76, model call recordings 72, and model call metrics 74.

Call manager 42 maintains information on agents 48 and other users of system 30 and facilitates communication among users. Call manager 42 may include any suitable combination of hardware, software, and/or encoded logic and is used by ACD 34a to manage agents 48 and other users of system 30. In particular embodiments, call manager 42 may maintain a listing, table, or other organization of information about agents 48 and other users of system 30. The information may include a name or other identifier for each agent 48 and other user. The information may also include contact information such as phone numbers and email addresses for the agents 48 and users. For identifying agents 48a-48d that may be contacted or otherwise recruited to handle incoming calls received by the ACD 34a, call manager 42 may also include information identifying whether a user of system 30 is a call agent or performs other tasks within the organization. In particular embodiments call manager 42 may represent any appropriate combination hardware, software and/or encoded logic distributed throughout a communication network coupled with the ACD.

Recording module 50 records calls between agents 48 and callers of ACD 34a, such as caller 60, and generates call recordings 70 that are stored in memory module 52. Training module 54 facilitates training of agents 48 by playing previously recorded calls, such as those captured by call recordings 70, to agents 48 through endpoints 49. Monitoring module 48 monitors call metrics 68 and, when appropriate, connects supervisor 90 to ongoing calls to facilitate monitoring of these calls by supervisor 90. Distributor 58 connects incoming calls with appropriate agents 48 or, if appropriate, stores calls in queues 54 to wait for an available agent 48. Each of recording module 50, training module 54, and distributor 58 may represent any suitable combination of hardware, software, and/or encoded logic located within ACD 34a or distributed throughout communication network 30. In particular embodiments, recording module 50, training module 54, and distributor 58 represent, at least in part, software applications running on processor 46.

Additionally, FIG. 2 illustrates a plurality of agents 48 and a caller 60 associated with ACD 34a. Agents 48 use associated endpoints 49 to communicate with callers to ACD 34a, such as caller 60, and caller 60 uses endpoint 62 to communicate with agents 48 associated with ACD 34a. Endpoints 49 and 62 may be similar to one or more of the endpoints 32 described above with respect to FIG. 1, such as IP phone endpoint 32d. Endpoints 49 and 62 may be coupled to ACD 34a through one or more communication networks, such as communication networks described above with respect to FIG. 1 which may include one or more WANs or LANs as indicated above. Although FIG. 2 shows an embodiment of ACD 34a configured to operate with a particular number of agents 48 and a single caller 60, alternative embodiments of ACD 34a may be configured to operate with any suitable number of agents 48 and callers 60.

Also shown in FIG. 2 is a supervisor 90 capable of listening in on a call between a caller 60 and an agent 48, reviewing metrics associated with the call, and/or monitoring the call in any other suitable manner based on the configuration of ACD 34 and the type of call in question. In particular embodiments, supervisor 90 may represent a manager or other appropriate supervisory party responsible for overseeing performance of one or more agents 48. In particular embodiments, communication system 30 may include an endpoint 92 that allows supervisor 90 to monitor calls being handled by one or more agents 48 and/or interact with agents 48 and caller 60. Although FIG. 2 illustrates one supervisor 90, ACDs of particular embodiments may utilize any suitable number of supervisors.

In operation, particular embodiments may be configured to facilitate supervisor monitoring. For example, when an incoming call is received by ACD 34a, distributor 58 may determine if a suitable agent 48 is available to receive the incoming call. If a suitable agent is available to receive the incoming call, distributor 58 distributes the call to that agent for handling. For example, distributor 58 may connect a voice or video call with an available agent capable of handling calls of that type. If a suitable agent is not available, the call may be placed into a queue 56 in order to wait for an appropriate agent. In this embodiment, ACD 34a has two queues 56; however other embodiments of the present invention may have none, one or more than two queues 56. The selection of which queue 56 to place an incoming call may depend on the type of customer making the call, the type of service requested in the call or any other characteristic or condition relating to the call or to ACD 34a. While a caller 60 is waiting for an agent, ACD 34a may perform one or more of several functions including data collection from caller 60, playing of pre-recorded messages, or other automated processes. As soon as a suitable agent 48 becomes available, distributor 58 distributes the call to the appropriate agent 48, assumed here for purposes of illustration, to be agent 48a.

As part of distributing the call to a particular agent, ACD 34a initiates a call connection between agent 48a and caller 60. Once the call connection is initiated agent 48a may begin interacting with caller 60. Agent 48a may provide caller 60 information, answer questions for caller 60, place an order for caller 60, and/or assist caller 60 in any suitable manner appropriate in conjunction with the services offered by ACD 34a. Additionally, in particular embodiments, recording module 50 may be configured to record all calls handled by that ACD 34a, and recording module 50 may, as a result, automatically begin recording the call when the call connection is initiated between agent 48a and caller 60. Moreover, in recording the call, recording module 50 may generate call recording 70 in memory module 52.

While agent 48a and caller 60 are interacting monitoring module 48 monitors call metrics 68 associated with the call. These metrics may represent, specify, or describe any appropriate characteristic, criteria, or property of the call and/or any associated outcome of the call. Examples of call metrics 68 include, but are not limited to, the amount of time elapsed since caller 60 was connected to agent 48a, the total amount of time elapsed since caller 60 initially contacted ACD 34a, whether caller 60 has requested to speak with a manager or supervisor of agent 48a, whether agent 48a has attempted to transfer the call to another agent 48, and whether a particular transaction associated with the call, such as a sale or order, is completed. Monitoring module 48 may also, in particular embodiments, record call metrics 68 in memory module 52 for subsequent review by supervisor 90 or another appropriate party.

At an appropriate point during the interaction between caller 60 and agent 48a, monitoring module 48 may determine, based on call metrics 68, that supervisor monitoring is appropriate. Monitoring module 48 may determine that supervisor monitoring is appropriate by comparing call metrics 68 to call metrics stored in memory module 52, by comparing call metrics 68 to current averages for all agents 48 associated with ACD 34a, or in any other suitable manner. For example, in particular embodiments, ACD 34a stores model call metrics 74 that are associated with a call that had desirable characteristics or outcome. If monitoring module 48 determines that call metrics 68 associated with the ongoing call between caller 60 and agent 48a differ from model call metrics 74 by a predetermined amount, monitoring module 48 may initiate supervisor monitoring.

In response to deciding to initiate supervisor monitoring, monitoring module 48 may identify an available supervisor 90. Monitoring module 48 may then connect the supervisor 90 to the ongoing call in an appropriate manner based on the configuration and capabilities of ACD 34a. For example, monitoring module 48 may connect supervisor 90 to the ongoing call so that supervisor 90 may interact with either or both of agent 48a and caller 60. Alternatively, monitoring module 48 may connect supervisor 90 in a manner such that supervisor 90 may only monitor the audio, video, or textual interaction between agent 48a and caller 60, call metrics 68, or any other suitable aspect of the call. For example, in particular embodiments, monitoring module 48 may connect supervisor 90 to the call in a manner that allows supervisor 90 to listen to the ongoing call but does not allow supervisor 90 to speak to either party.

If monitoring module 48 decides to initiate supervisor monitoring but no supervisor is currently available, monitoring module 48 may initiate recording of the call by recording module 50. Alternatively, in embodiments of ACD 34 in which all calls are recorded, recording module 50 may mark call recording 70 for the ongoing call to indicate that the call was selected for supervisor monitoring and/or take other appropriate steps to ensure that that call recording 70 is preserved and/or subsequently reviewed. Once the call is completed, call recording 70 generated by recording module 50 may be reviewed by supervisor 90 and/or agent 48a. As a result, call recording 70 may be used as a training tool to allow supervisor 90 to identify and agent 48a to correct the call-handling techniques that caused monitoring module 48 to begin supervisor monitoring. As one example, supervisor 90 may later review with agent 48a a particular call recording 70 that exceeded a desired call length and explain to agent 48a ways in which agent 48a may complete such calls more quickly in the future.

Instead of or, in addition to, initiating recording of the ongoing call, monitoring module 48 may also store the call in supervisory queue 66 to wait for an available supervisor. In such embodiments, monitoring module 48 may monitor the availability of all supervisors 90 associated with ACD 34a. When one of these supervisors 90 becomes available monitoring module 48 may connect the available supervisor 90 to the call at the front of the supervisor queue 66, as described above.

Thus, monitoring module 48 may provide an efficient manner for identifying calls that should be monitored by supervisors 90 and connecting these calls to supervisors 90 as supervisors 90 come available. Consequently, particular embodiments may free supervisors 90 from the responsibility of determining which calls to monitor and allow supervisors 90 to focus on supervising the appropriate calls and/or completing other tasks. Additionally, because monitoring module 48, in particular embodiments may initiate recording of a particular call only in response to determining that no supervisor 90 is available, storage space within memory module 52 and processing resources of ACD 34a may be conserved. In this regard, particular embodiments may provide multiple operational benefits.

In addition to or instead of providing the described supervisor monitoring features, particular embodiments may be configured to facilitate training of agents 48 when agents 48 are not responding to calls. In particular embodiments, training module 54 may be configured to determine whether a particular agent 48 is available for training and, if so, initiate playback model call recordings 72 to agents 48. For the purposes of this description and the claims that follow, ACD 34a may "initiate playback" by transmitting audio, video, and/or text data associated with model call recordings 72 in an appropriate form (for example, as a plurality of VoIP packets) to endpoints 49, transmitting audio signals to another component of communication system 30 (such as a speaker or a video monitor) associated with agent 48, and/or taking any other appropriate steps to initiate playback of model call recordings 72 in any manner appropriate based on the configuration and capabilities of ACD 34.

Moreover, ACD 34a may be capable of determining whether an agent 48 is available in any suitable manner. In particular embodiments, ACD 34a may use processor 46 to monitor conditions of ACD 34a, such as the number, type or characteristics of calls in queues 54 or the "state" of each agent 48. In some embodiments, such monitoring may be performed in conjunction with a presence server or other component providing presence detection and functionality. Agents 48 may be placed in various states, such as a "ready-and-requesting-training" state, a "ready-and-undergoing-training" state, a "ready-requesting-training" state, a "not ready" state, or a "talking" state, according to their current status with respect to ACD 34a. For example, an agent 48 in a ready state may be ready and able to accept an incoming call distributed by ACD 34a, but not currently receiving nor requesting training. Moreover, an agent 48 in a ready-requesting-training state is currently ready and requesting training, while an agent 48 in a ready-undergoing-training state is ready and currently receiving training, for example, by listening to a recorded training call. Conversely, an agent 48 in a not ready state may be away from his desk or otherwise unavailable for accepting an incoming call or training, and an agent 48 in a talking state may be communicating on a previously established ACD-related or customer-related call.

Model call recordings 72 comprise recordings of portions or the entirety of calls that have been selected to illustrate correct or incorrect techniques for interacting with callers 60. For example, in particular embodiments, recording module 50 may record all calls received by ACD 34a, and training module 54 may be capable of selecting one or more model call recordings 72 for playback from a plurality of call recordings 70 based on call metrics 68 associated with the relevant call recordings 70. As one example, training module 54 may be capable of identifying all calls that lasted less than a predetermined maximum time and playing one or more of these calls to agents 48. Consequently, in such embodiments, model call recordings 72 may represent a subset of call recordings 70 generated during operation of ACD 34*a*.

In some embodiments, supervisor 90 or another appropriate party may manually select model call recordings 72 from the call recordings 70 created by recording module 50 or may store model call recordings 72 in memory module 52 that represent recordings of scripted phone calls demonstrating proper or incorrect techniques for agents 48 to handle calls. In general, however, model call recordings 72 may be selected and/or created in any suitable manner. After completing playback of a model call recording 72 to a particular agent 48, training module 54 may being playback of another model call recording 72 or return that agent 48 to an idle state based on the number of calls currently in queues 56, the training history of that agent 48, and/or any other appropriate considerations.

Furthermore, training module 54 may determine whether an agent 48 is available for training in any suitable manner. As one example, training module 54 may detect whether a particular agent 48 is currently engaged in a call. If the relevant agent 48 is not currently engaged in a call, training module 54 may determine that the relevant agent 48 is available to receive training. As another example, in some embodiments, training module may be capable of detecting whether the relevant agent 48 has requested training, for example, by activating a particular input of the endpoint 49 associated with that agent 48. In such embodiments, training module 54 may determine that the relevant agent 48 is available to receive training if that agent 48 is not currently engaged in a call and has also requested training.

After initiating training for a particular agent 48, for example agent 48*b*, training module 54 may, as appropriate, interrupt playback of a model call recording 72 to allow agent 48*b* to respond to incoming calls from callers. For example, in particular embodiments, training module 54 may be configured to interrupt playback of model call recordings 72 to agent 48*b* whenever ACD 34*a* receives a new incoming call and training module 54 determines that all agents 48 other than agent 48*b* are already engaged in calls with callers 60 such that the new incoming call should be distributed to agent 48*b*. In alternative embodiments, training module 54 may determine based on predetermined criteria whether to interrupt playback to agent 48*b* or to place the call in one of queues 56 and continue playback of model call recordings 72 to agent 48*b*. As one example, training module 54 may determine based on an estimated wait time for calls in either or both of queues 56 whether to interrupt playback of model call recording 72 and distribute the incoming call to agent 48*b* or to place the incoming call in a queue 56 and continue playback. As another example, an operating entity of ACD 34*a* may be obligated to satisfy a service level goal of a service level agreement (SLA). The service level goal may specify a maximum time callers 60 will wait before speaking with an agent 48 or a satisfactory value or range for any other suitable criteria for measuring the performance of ACD 34. If ACD 34*a* is currently answering incoming calls in a manner that satisfies this SLA, ACD 34*a* may place the incoming call in a queue 56, and training module 54 may continue playback to agent 48*b*. If, instead, the ACD 34*a* is not currently answering calls in a manner that satisfies the SLA, ACD 34*a* may route the incoming call to agent 48*b*, and training module 54 may terminate playback to agent 48*b*. Particular embodiments may implement various methods for distributing calls and initiating or terminating playback based on service level goals.

Additionally, training module 54 may maintain a training profile 76 for one or more agents 48 that documents the training of that agent 48. As one example, if multiple model call recordings 72 are stored in memory module 52, training module 54 may document in training profile 76 which model call recordings 72 the associated agent 48 has heard. Training module 54 may then select a model call recording 72 for a particular agent 48 based on which model call recordings 72 that agent has already heard. Moreover, in particular embodiments, training module 54 may select model call recordings 72 based on the various lengths of the model call recordings 72 that the agent 48 has yet to hear and on an estimated idle time for that agent 48. For example, training module 54 may estimate based on the contents of queues 56 and average traffic levels of ACD 34*a* the amount of time until agent 48 will need to answer an incoming call. Training module 54 may then select, from among the model recorded calls that the relevant agent 48 has not yet heard, a model call recording 72 that has a playing time less then the estimated idle time for that agent 48.

As another example, when training module 54 interrupts playback of a particular model call recording 72 to a particular agent 48 to allow that agent 48 to answer an incoming call or for any other reason, training module 54 may indicate in training profile 76 the point in model call recording 72 at which training module 54 terminated playback. Training module 54 may then resume playback of that same model call recording 72 at the indicated point in the model recorded call. In general, however, training module 54 may store any appropriate information associated with the training of agents 48 in training profiles 76.

Thus, particular embodiments may provide for automated training of agents 48. As a result, an ACD may reduce idle time for agents 48 without requiring supervisor 90 to continually monitor the current availability of agents 48. Additionally, particular embodiments may be configured to limit interruptions to this training thereby increasing the effectiveness of such training sessions. Moreover, training module 54 may document the progress of training for particular agents 48 thereby allowing training module 54 to personalize training for these agents 48 and providing a useful record of the progress of these agents 48 that may be used, for example, as a basis for distributing promotions or other incentives to agents 48.

It will be recognized by those of ordinary skill in the art that ACD 34*a* is merely one example configuration of an ACD for providing the described call-recording and training functionalities, in accordance with particular embodiments of the present invention. ACD 34*a* may include any number of interfaces, call managers, processors, memory modules, distributors, queues and other modules to accomplish the functionality and features described herein. For example, although ACD 34*a* is illustrated and described as including call manager 42, interface 44, processor 46, monitoring module 48, recording module 50, training module 54, memory module 52, two queues 56, distributor 58, these components and other desired components for performing the above described functionality may be centrally located (local) with respect to one another, or distributed throughout communication system 30.

Figure 3:
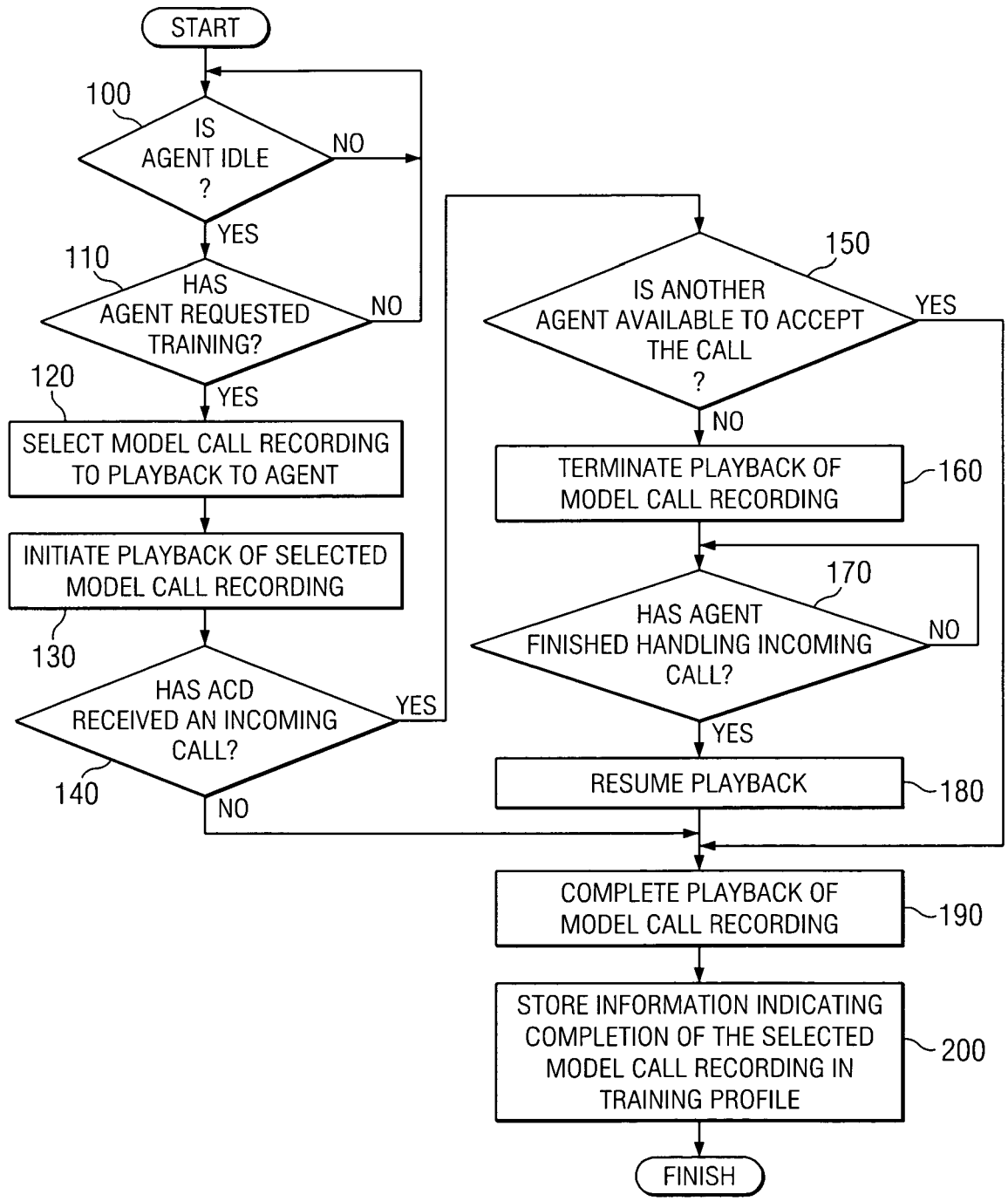
FIG. 3 illustrates a method for providing training to agents in a call distribution system, in accordance with an embodiment of the present invention.

FIG. 3 is a flowchart illustrating a method for providing training to agents 48 of an ACD 34, in accordance with a particular embodiment. The method begins at step 100 with ACD 34 determining whether a particular agent is idle. If the relevant agent 48 is not idle, for example if the agent is currently helping a caller 60, operation returns to step 100 to wait until that agent becomes idle.

If ACD 34 determines, at step 100, that agent 48 is currently idle, ACD 34 then determines whether agent 48 has requested training, at step 110. If agent 48 has not requested training, operation returns to step 100, in the described embodiment.

Thus, ACD 34, in this embodiment, only checks once to see if the agent 48 has requested training once each time agent 48 becomes idle. In alternative embodiments, however, ACD 34 may continue to check to see if agent 48 has requested training until ACD 34 determines that agent 48 is no longer idle. Additionally, although FIG. 3 illustrates a method for providing training in which ACD 34 provides training to agent 48 only if agent 48 has requested training, in particular embodiments, ACD 34 may instead decide whether to provide training to agent 48 without considering whether agent 48 has requested training and, as a result, ACD 34 may not make any determination of whether agent 48 has requested training.

If ACD 34 determines that agent 48 has requested training, ACD 34 selects a particular model call recording 72 to playback to agent 48 at step 120. ACD 34 may select a particular model call recording 72 based on a training profile associated with agent 48, a playback time associated with the selected model call recording 72, a type of model call recording 72 requested by agent 48, and/or any other appropriate information. At step 130, ACD 34 initiates playback of the selected model call recording 72. At step 140, ACD 34 determines whether ACD 34 has received an incoming call from caller 60. If ACD 34, has not received an incoming call from caller 60, ACD 34 continues playback of the selected model call recording 72.

If ACD 34, has received an incoming call from caller 60, ACD 34 determines, at step 150, whether an agent other than agent 48 is available to accept the call. If ACD 34 determines that another agent 48 is available, ACD 34 continues playback of model call recording 72 at step 140. If another agent 48 is not currently available, ACD 34 may terminate playback of the selected model call recording at step 150. In the illustrated embodiment, ACD 34 may also store information indicating the point within the selected model call recording 72 where ACD 34 terminated playback at step 160. ACD 34 may then connect the incoming call to agent 48 at step 160.

At step 170, ACD 34 determines whether agent 48 has finished handling the incoming call. If agent 48 has finished handling the incoming call, ACD 34 resumes playback of the selected model call recording 72. In particular embodiments, ACD 34 may access a training profile 76 associated with agent 48 to determine a location within the selected model call recording 72 at which ACD 34 terminated playback and may resume playback starting from this location. Operation of ACD 34 then continues at step 190.

At step 190, ACD 34 completes playback of the selected model call recording 72. ACD 34 then stores information indicating that agent 48 has completed playback of the selected model call recording 72 in a training profile 76 associated with agent 48 at step 200. ACD 34 may then terminate training of agent 48 as shown in FIG. 3. Alternatively, in particular embodiments, operation of ACD 34 may return to step 100 and ACD 34 may determine whether agent 48 is available for additional training.

Although FIG. 3 illustrates steps executed by a particular embodiment of ACD 34 in a particular order, alternative embodiments of ACD 34 may perform all, some, or none of these steps and may do so in any appropriate order. Moreover, any two or more of the steps illustrated in FIG. 3 may be combined, modified or deleted where appropriate, and additional steps may also be added to the flowchart.

As indicated above, technical advantages of particular embodiments of ACD 34 include methods and systems for providing training to agents communicating with callers to an ACD 34. The techniques supported by particular embodiments of ACD 34 may optimize use of idle time by agents 48. Additionally, particular embodiments of ACD 34 may incorporate functionality to limit or reduce the disruptiveness of incoming calls received while ACD is providing training to a particular agent 48. The described training may, in particular embodiments, improve agent performance, increased the likelihood of reduce customer wait-time, and in general result in more effective operation of ACDs and their associated agents. Additionally, particular embodiments of ACD 34 may provide improved methods and systems for supervising performance of agents associated with ACD 34.

Although the present invention has been described in detail with reference to particular embodiments, it should be understood that various other changes, substitutions, and alterations may be made hereto without departing from the spirit and scope of the present invention. For example, although the present invention has been described with reference to a number of elements included within communication system 30 and ACD 34a, these elements may be combined, rearranged or positioned in order to accommodate particular routing architectures or needs. In addition, any of these elements may be provided as separate external components to communication system 30, ACD 34a or each other where appropriate. The present invention contemplates great flexibility in the arrangement of these elements as well as their internal components. Numerous other changes, substitutions, variations, alterations and modifications may be ascertained by those skilled in the art and it is intended that the present invention encompass all such changes, substitutions, variations, alterations and modifications as falling within the spirit and scope of the appended claims.

What is claimed is:

1. A method for providing training to agents of an automatic call distribution center comprising:
   determining whether an agent is idle;
   in response to determining that the agent is idle, initiating playback of a recorded training call to the agent;
   receiving an incoming call from a caller for connection with one of a plurality of agents;
   terminating playback of the recorded training call;
   connecting the agent to the incoming call;
   wherein terminating playback of the recorded training call comprises:
      determining whether a service level goal is being satisfied; and
      in response to determining that the service level goal is not being satisfied, terminating playback of the recorded training call;
   wherein initiating playback of a recorded training call comprises:
      selecting a recorded training call from a plurality of recorded training calls based on a training profile associated with the agent; and
      initiating playback of the selected recorded training call to the agent;
   wherein the training profile specifies a recorded training call and a termination point within the recorded training call, the termination point comprising a point at which playback of the recorded training call was terminated during a previous playback of the recorded training call to the agent;
   wherein selecting a recorded training call based on the training profile comprises selecting the recorded training call specified by the training profile; and
   wherein initiating playback of the selected recorded training call comprises initiating playback of the selected recorded training call at the termination point.

2. The method of claim 1, wherein terminating playback of the recorded training call comprises:

deciding based on an estimated wait time associated with a queue comprising additional calls awaiting connection with one of the plurality of agents whether to terminate playback of the recorded training call; and in response to deciding to terminate playback, terminating playback of the recorded training call.

3. The method of claim 1, wherein:
the training profile specifies one or more recorded training calls previously played to the agent; and
selecting the recorded training call based on the training profile comprises selecting the recorded training call based on recorded training calls previously played to the agent.

4. The method of claim 1, wherein:
the training profile specifies a skill associated with the agent; and
selecting the recorded training call based on the training profile comprises selecting the recorded training call based on the skill associated with the agent.

5. The method of claim 1, wherein initiating playback of a recorded training call comprises:
selecting a recorded training call from a plurality of recorded training calls based on playing times associated with the plurality of recorded training calls; and
initiating playback of the selected recorded training call to the agent.

6. A system for transferring a call at an automatic call distribution system, comprising:
an interface operable to receive from a caller a call for connection with one of a plurality of agents; and
a processor coupled to the interface and operable to:
determine whether an agent is idle;
in response to determining that the agent is idle, initiate playback of a recorded training call to the agent;
receive an incoming call from a caller for connection with one of a plurality of agents;
terminate playback of the recorded training call;
connect the agent to the incoming call;
wherein the processor is operable to terminate playback of the recorded training call by:
determining whether a service level goal is being satisfied; and
in response to determining that the service level goal is not being satisfied, terminating playback of the recorded training call;
wherein the processor is operable to initiate playback of the recorded training call by:
selecting a recorded training call from a plurality of recorded training calls based on a training profile associated with the agent; and
initiating playback of the selected recorded training call to the agent;
wherein the training profile specifies a recorded training call and a termination point within the recorded training call, the termination point comprising a point at which playback of the recorded training call was terminated during a previous playback of the recorded training call to the agent;
wherein the processor is operable to select a recorded training call based on the training profile by selecting the recorded training call specified by the training profile; and
wherein the processor is operable to initiate playback of the selected recorded training call by initiating playback of the selected recorded training call at the termination point.

7. The system of claim 6, wherein the processor is operable to terminate playback of the recorded training call by:
deciding based on an estimated wait time associated with a queue comprising additional calls awaiting connection with one of the plurality of agents whether to terminate playback of the recorded training call; and
in response to deciding to terminate playback, terminating playback of the recorded training call.

8. The system of claim 6, wherein:
the training profile specifies one or more recorded training calls previously played to the agent; and
the processor is operable to select the recorded training call based on the training profile by selecting the recorded training call based on recorded training calls previously played to the agent.

9. The system of claim 6, wherein:
the training profile specifies a skill associated with the agent; and
the processor is operable to select the recorded training call based on the training profile by selecting the recorded training call based on the skill associated with the agent.

10. The system of claim 6, wherein the processor is operable to initiate playback of a recorded training call by:
selecting a recorded training call from a plurality of recorded training calls based on playing times associated with the plurality of recorded calls; and
initiating playback of the selected recorded training call to the agent.

11. Logic embodied in a computer readable medium, the computer readable medium comprising code operable to:
determine whether an agent is idle;
in response to determining that the agent is idle, initiate playback of a recorded training call to the agent;
receive an incoming call from a caller for connection with one of a plurality of agents;
terminate playback of the recorded training call;
connect the agent to the incoming call;
wherein the code is operable to terminate playback of the recorded training call by:
determining whether a service level goal is being satisfied; and
in response to determining that the service level goal is not being satisfied, terminating playback of the recorded training call;
wherein the code is operable to initiate playback of the recorded training call by:
selecting a recorded training call from a plurality of recorded training calls based on a training profile associated with the agent; and
initiating playback of the selected recorded training call to the agent;
wherein the training profile specifies a recorded training call and a termination point within the recorded training call, the termination point comprising a point at which playback of the recorded training call was terminated during a previous playback of the recorded training call to the agent;
wherein the code is operable to select a recorded training call based on the training profile by selecting the recorded training call specified by the training profile; and
wherein the code is operable to initiate playback of the selected recorded training call by initiating playback of the selected recorded training call at the termination point.

12. The logic of claim 11, wherein the code is operable to terminate the playback of the recorded training call by:

deciding based on an estimated wait time associated with a queue comprising additional calls awaiting connection with one of the plurality of agents whether to terminate playback of the recorded training call; and in response to deciding to terminate playback, terminating playback of the recorded training call.

13. The logic of claim 11, wherein:

the training profile specifies one or more recorded training calls previously played to the agent; and the code is operable to select the recorded training call based on the training profile by selecting the recorded training call based on recorded training calls previously played to the agent.

14. The logic of claim 11, wherein:

the training profile specifies a skill associated with the agent; and the code is operable to select the recorded training call based on the training profile by selecting the recorded training call based on the skill associated with the agent.

15. The logic of claim 11, wherein the code is operable to initiate playback of a recorded training call by:

selecting a recorded training call from a plurality of recorded training calls based on playing times associated with the plurality of selected recorded training calls; and initiating playback of the selected recorded training call to the agent.

16. A system for providing training to agents of an automatic call distribution center comprising:

means for determining whether an agent is idle;

means for initiating playback of a recorded training call to the agent, in response to determining that the agent is idle;

means for receiving an incoming call from a caller for connection with one of a plurality of agents;

means for terminating playback of the recorded training call;

means for connecting the agent to the incoming call; and wherein means for terminating playback of the recorded training call comprises:

means for determining whether a service level goal is being satisfied; and means for, in response to determining that the service level goal is not being satisfied, terminating playback of the recorded training call;

wherein means for initiating playback of a recorded training call comprises:

means for selecting a recorded training call from a plurality of recorded training calls based on a training profile associated with the agent; and means for initiating playback of the selected recorded training call to the agent;

wherein the training profile specifies a recorded training call and a termination point within the recorded training call, the termination point comprising a point at which playback of the recorded training call was terminated during a previous playback of the recorded training call to the agent;

wherein means for selecting a recorded training call based on the training profile comprises means for selecting the recorded training call specified by the training profile; and wherein means for initiating playback of the selected recorded training call comprises means for initiating playback of the selected recorded training call at the termination point.

* * * * *